United States Patent
Koller et al.

(10) Patent No.: US 8,468,047 B2
(45) Date of Patent: Jun. 18, 2013

(54) APPRAISAL PROCESSING

(75) Inventors: Walter Koller, Bad Schönborn (DE);
Mathias Schoenecker, Forst (DE);
Maurice Hagen, Heidelberg (NL)

(73) Assignee: SAP Akteiengesellschaft, Waldorf (DE)

( * ) Notice: Subject to any disclaimer, the term of this patent is extended or adjusted under 35 U.S.C. 154(b) by 2352 days.

(21) Appl. No.: 10/135,885

(22) Filed: Apr. 29, 2002

(65) Prior Publication Data
US 2003/0204423 A1   Oct. 30, 2003

(51) Int. Cl.
*G06Q 10/00* (2012.01)
(52) U.S. Cl.
USPC ...................................................... 705/7.42
(58) Field of Classification Search
USPC .................................................. 705/11, 7.42
See application file for complete search history.

(56) References Cited

U.S. PATENT DOCUMENTS

| | | | |
|---|---|---|---|
| 5,926,794 A | 7/1999 | Fethe | |
| 6,119,097 A | 9/2000 | Ibarra | |
| 6,662,164 B1 | 12/2003 | Koppelman et al. | |
| 7,069,266 B2 * | 6/2006 | Calderaro et al. | 707/783 |
| 2002/0035500 A1 | 3/2002 | Yoko et al. | |
| 2002/0035506 A1 | 3/2002 | Loya | |
| 2003/0004967 A1 | 1/2003 | Calderaro et al. | |
| 2003/0204424 A1 | 10/2003 | Koller et al. | |
| 2003/0204440 A1 | 10/2003 | Koller et al. | |
| 2003/0229529 A1 | 12/2003 | Mui et al. | |

OTHER PUBLICATIONS

Koller, Walker et al., "Management by Objectives," U.S. Appl. No. 10/135,890, filed Apr. 29, 2002.
Koller, Walker et al., "Appraisal and Objectives Integration," U.S. Appl. No. 10/135,884, filed Apr. 29, 2002.
Dinesh, David et al., "Management by Objective and the Balanced Scorecard: Will Rome Fall Again?", 1998, Management Decision, vol. 36, Issue 6, p. 363. [ProQuest].
Simpson, John A., "Management by Objective for Appraisal Firms," Jul. 1993, The Appraisal Journal, vol. 61, Issue 3, pp. 380-385. [ProQuest].
Muczyk, Jan P. et al., "MBO as a Complement to Effective Leadership," May 1989, The Academy of Management Executive, vol. 3, Issue 2, pp. 131-138. [ProQuest].
Odiome, George, "MBO Means Having a Goal and a Plan Not Just a Goal," Sep. 1992, Manage, vol. 44, Issue 1, pp. 8-11. [ProQuest].

* cited by examiner

*Primary Examiner* — Andre Boyce
(74) *Attorney, Agent, or Firm* — Finnegan, Henderson, Farabow, Garrett & Dunner, LLP

(57) ABSTRACT

A software program assists in establishing goals and objectives and creating appraisals based on those goals and objectives. The goals for an organization are determined, and individual objectives based on the goals are defined. The software program assigns weights to the individual objectives, and obtaining a plurality of appraisals based on the individual objectives. A final appraisal is created by combining the plurality of appraisals based on the weight. The plurality of appraisals may be obtained using different appraisal types, including objective-setting, simple appraisal, and 360 degree feedback.

14 Claims, 4 Drawing Sheets

APPRAISAL PROCESSING

TECHNICAL FIELD

This invention relates to personnel management software, and more particularly to objective setting and appraisal management systems.

BACKGROUND

Global competition not only forces enterprises to optimize their operating business processes, it also means that they have to react to new developments on a strategic level. Although most enterprises are far from being strategically optimized, this is exactly what will separate successful enterprises from less successful ones in the future.

This dynamic change in the enterprise environment means that human resource (HR) departments, too, face completely new tasks. It is no longer enough to support enterprise strategy with cost-optimized personnel management and to provide qualified employees. The future of personnel management lies in a consistent, strategic orientation. HR departments must ask themselves what part they can play in reaching enterprise goals and how they can increase the value of the enterprise.

By proactively participating in the implementation of enterprise strategy, an HR department can develop into an important link in the value chain and position itself as consultant and partner for management and employees.

Several factors are very important here: reliable cost planning, new recruitment processes, building up compensation models that are internationally recognized and comparable, and the introduction of up-to-the-minute systems for personnel management, communication, and analysis. But until now, there have been no integrated, e-business software solutions that handle these processes and also offer complex evaluation, analysis, and simulation options.

SUMMARY

A software program assists in establishing goals and objectives and creating appraisals based on those goals and objectives. The goals for an organization are determined, and individual objectives based on the goals are defined. The software program assigns weights to the individual objectives, and obtaining a plurality of appraisals based on the individual objectives. A final appraisal is created by combining the plurality of appraisals based on the weight. The plurality of appraisals may be obtained using different appraisal types, including objective-setting, simple appraisal, and 360 degree feedback.

DESCRIPTION OF DRAWINGS

These and other features and advantages of the invention will become more apparent upon reading the following detailed description and upon reference to the accompanying drawings.

DETAILED DESCRIPTION

Converting company goals into concrete, measurable employee objectives creates clearly defined expectations. The employees are then better able to meet their individual goals, and the performance of the employees is more easily measured. Management by Objectives creates and utilizes a concrete set of company goals. A Balanced Scorecard is often used in conjunction with Management by Objectives. Scorecards allow development of employee objectives that are based on your enterprise's goals and visions. The definition of a balanced scorecard is based on four perspectives that contribute to the success of an enterprise:

Financial
Customer
Process
Learning and development

At the enterprise level, strategic enterprise goals are set to be met for each of these perspectives. You can then break down these goals to area and department goals and store them in scorecards. For each strategic goal in a scorecard, concrete initiatives and key figures are defined. In other words, the objective, how it will be reached, and what measurement will be used to determine if it was reached is described. As a final step, departmental goals are broken down into objectives for individual employees.

Figure 1:
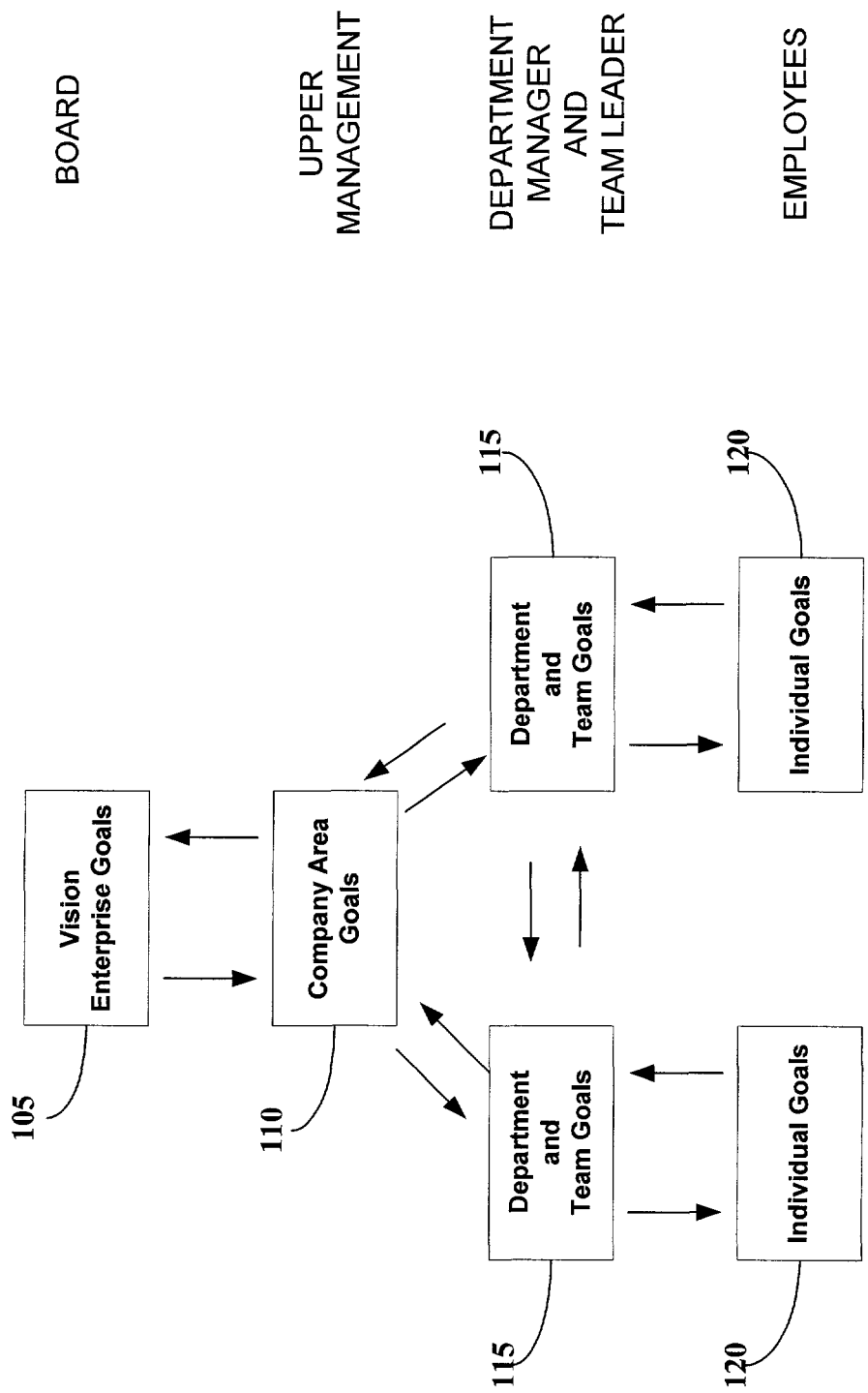
FIG. 1 illustrates the goal setting process of an organization using both a top-down and a bottom-up process.

Referring to FIG. 1, objectives are set during planning meetings that take place at every level of the enterprise. The objectives may begin at the board level, where vision enterprise goals 105 are determined. An upper management level may take the vision enterprise goals 105 and determine the company area goals 110 that are needed for each area of the company to achieve the vision enterprise goals 105. The company area goals 110 are forwarded to the department manager and team leader level, where department and team goals 115 are determined. From the department and team goals 115, individual goals 120 may be created at the employee level.

The vision enterprise goals 105 that the executive team has are communicated from the top down—from executives to managers to employees. During this process, the goals are differentiated and adjusted appropriately. Planning meetings provide a forum for soliciting employees' ideas and opinions and gaining employees' commitment to achieving objectives. As FIG. 1 illustrates, this transforms a top-down approach into a bottom-up process that includes all employees—one that can greatly increase employees' commitment to achieving objectives. The goals may be recorded in a software program such as SAP Strategic Enterprise Management (SEM).

Figure 2:
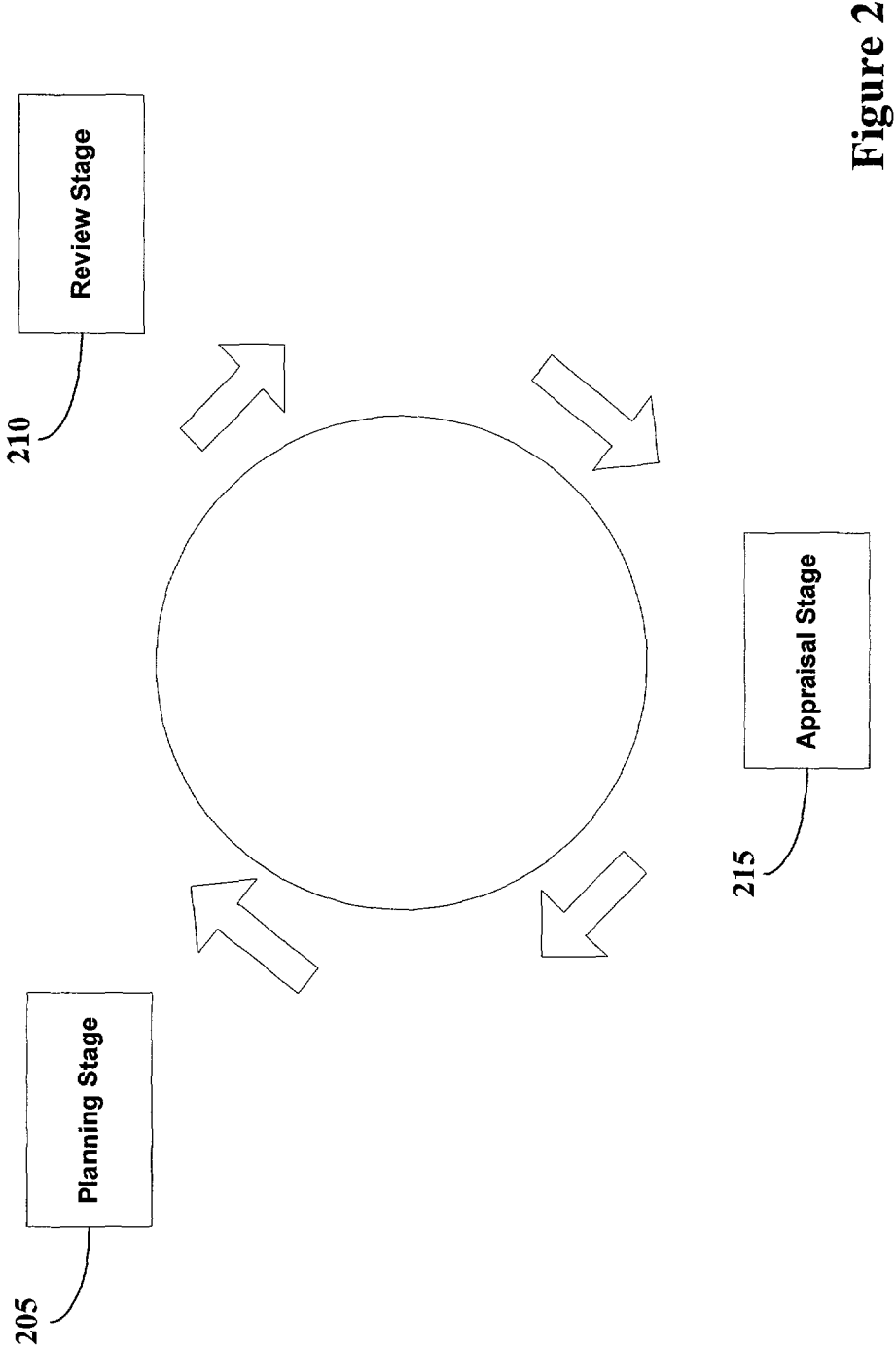
FIG. 2 illustrates a complete cycle of the management by objective process including planning, review, and appraisal.

As shown in FIG. 2, the management by objective process starts with a planning stage 205 including objective-setting interviews between employees and their superiors. During the interview, the superior and employee agree on concrete objectives (quantitative and qualitative) that are to be reached by an agreed-upon date.

Ideally, these concrete objectives support the vision enterprise goals 105 (which need to be communicated to employees in advance). In this way, employees can understand how they contribute to the success of the enterprise. If this method of personnel management is to be successful, both short-term objectives (those related to immediate performance) and long-term objectives (those related to personnel development and the mastery of competencies) should be defined, and employees should agree to complete them. Objectives should be realistic and achievable without being trivial. Linking the attainment of objectives to an employee's salary can increase the success of this method. The agreed upon objectives are recorded in the system and can be added to personnel files.

A review stage 210 provides feedback for the employee in the management by objectives process. The date for a review is set during the objective-setting interview. A formalized review takes place during the year and helps to ensure that employees do not lose sight of the objectives. At this review, the participants can compare the objectives with the results they have already achieved, determine if the objectives are still relevant, and modify them as necessary. If an additional review is required, the participants can set a new date.

In the appraisal stage 215, a final evaluation is conducted, based on the degree to which the employee has achieved objectives. If required, the immediate superior, several superiors, colleagues, employees, and even the individual being evaluated can perform the appraisal. Depending on the final appraisal, an employee's salary may be adjusted accordingly. At the same time, the planning stage 205 for the following period can be conducted, thus completing the cycle.

When a superior and employee have agreed upon the objectives, they can complete an objective-setting agreement (also known as an appraisal document) that records the objectives. The objective-setting agreement serves as the basis for reviews and for the final appraisal. The objective-setting agreement may be created using a template that may be accessed from a web interface or any other user interface. Because objectives are only usually set once a year, simple and intuitive Web interfaces have the advantage that they require little or no training, and acceptance is usually very high.

The department and team goal 115 and individual goals 120 may be automatically pulled from the departmental scorecard in a software program such as SAP SEM. These goals then appear as text in the objective-setting agreement. In addition, there can be a link to your department's Balanced Scorecard in SAP SEM so that employees can view departmental goals and their dependencies at any time.

The objective-setting agreement may define certain objectives, such as skills or knowledge that all employees in a department need to meet future challenges. For example, these objectives can be qualifications that are taken from a qualifications catalog. When the appraisal is complete, an employees' qualifications and proficiencies may be automatically inserted into their qualifications profiles.

Objectives may also be obtained from a requirements profile of the employee's position. Using Business Add-Ins (BAdI) technology, objectives may be further created automatically. For example, the requirements profile of a related job may be used to create objectives. Individual objectives may also be created so HR professionals and managers can take into account employees' special development objectives and their particular tasks.

The flexibility to create objectives means that those with personnel responsibility have numerous ways of differentiating between employees. This ensures that the performance requirements and the developmental potential of employees are taken into account properly, and it paves the way for employees to achieve their objectives effectively.

The present invention may take results from a performance overview assigned to the employee in a software program such as SAP SEM and include them in the final appraisal. In this way, the system establishes a direct connection to strategic objectives, initiatives, and individual measurement values that are stored in scorecards. Notes may be created in the objective-setting agreement, and the importance of each agreed-on objective may be weighed. This allows employees with personnel responsibility to ensure that the overall appraisal is balanced, i.e. important objectives have more weight than less important ones. After the employee's final appraisal, the present invention uses rules to determine the overall score based on all the appraisals from various sources (for example part and final appraisals).

The present invention includes at least three appraisal types; objective-setting, simple appraisal, and 360 degree feedback. The objective-setting appraisal with part and final appraisal is a type of appraisal specifically designed for Management by Objectives. It allows one to formulate objectives individually and to change or delete objectives during reviews. It allows appraisals by many different participants (for example the part appraisers whose evaluations can be used to determine the final appraisal). Each part appraiser's name appears on the document, and all the part appraisers edit the same appraisal document one after the other.

Appraisals of this type may be set up so that participants only see the parts of the appraisal document that are relevant to them. A manager may specify which parts of the document individual part appraisers can see and which appraisal elements they can evaluate. Restricted access options ensure that part appraisers cannot see other appraisals or confidential information (for example, a superior's appraisal). Privacy features ensure that appraisers can make their personal assessment without being influenced by others' opinions. Part appraisers may typically see, but not edit, appraisal elements that they are not authorized to evaluate.

Simple appraisals allow one appraisal for each appraisal criterion, along with a weighting of the individual appraisal criteria, if desired. This appraisal type is used for classic performance appraisals, which are not preceded by an objective-setting process. The appraisal elements can simply be taken from the job description. Examples of these appraisal elements could be the degree to which an employee has mastered a programming language or has demonstrated team spirit.

The present invention also allows collection of 360 degree feedback. The 360 degree appraisals can contain the same elements as simple appraisals or objective setting agreements. However, each part appraiser receives an appraisal document, which can be completed anonymously, if so desired. The submitted appraisals may then be evaluated using a wide range of criteria.

Figure 3:
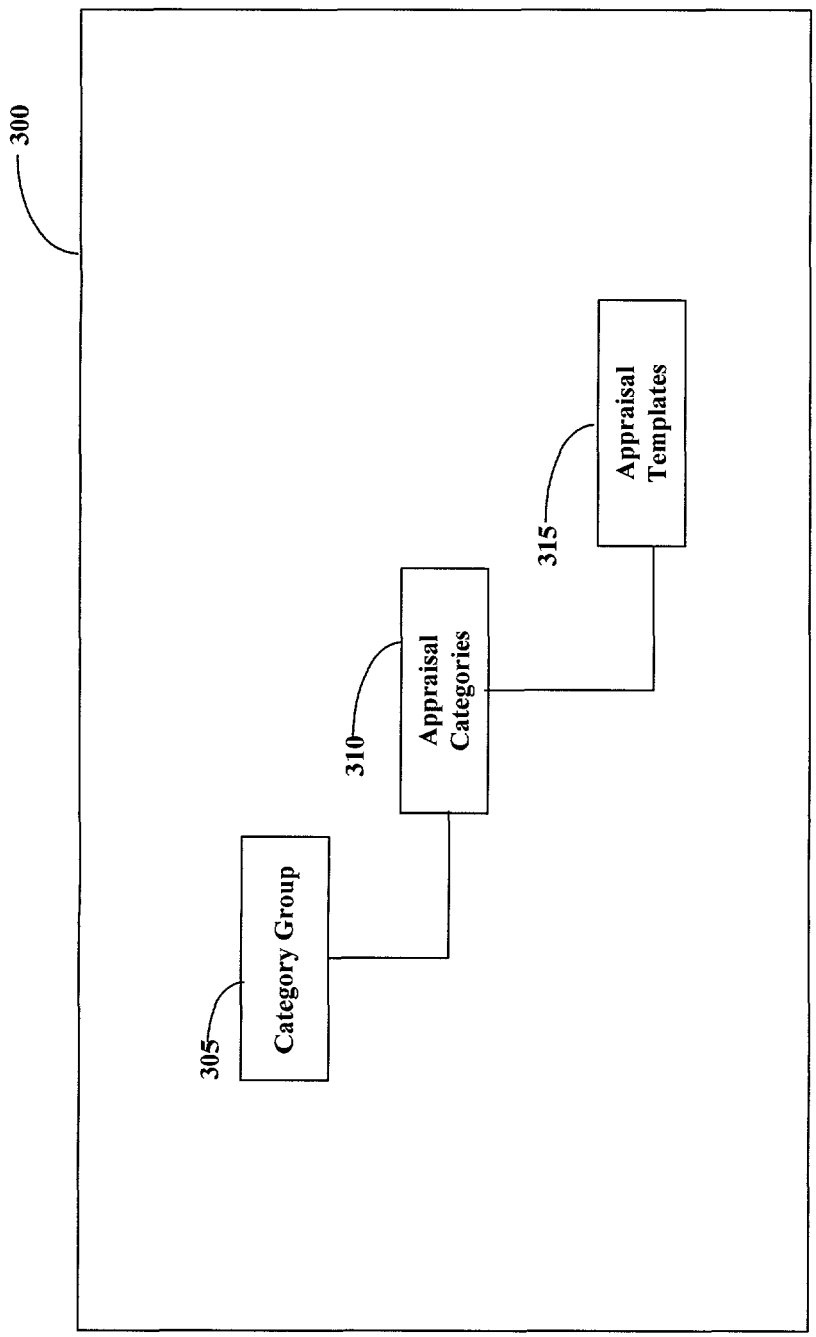
FIG. 3 illustrates an exemplary appraisal template catalog.

An appraisal template catalog 300 as shown in FIG. 3 allows for building up and managing an objective-setting and appraisal system. The elements that make up an objective-setting and appraisal system are clearly laid out in the appraisal template catalog in a convenient hierarchical structure. The top level of the hierarchy is the category group 305, which groups together the templates for particular areas. The level below this is made up of appraisal categories 310, which group together the objective-setting documents and appraisal templates. It is here that one specifies the appraisal type for the appraisal templates. Also at this level, a number of other standard values for the appraisal templates may be specified, including:

Which types of appraisers, appraisees, or other participants will be involved in the completion of the appraisal template.
  The columns available for appraisal templates of this category (for example, the objectives, part appraisals, and final appraisal columns).
  What roles the participants can have.
  Which value lists can be used in the appraisal templates. For example, one can allow only "yes" or "no" answers for a particular category.
  Which functions can be used for the appraisal templates in this category. Examples of this include calculation formulae (such as average or total), the origin of specific data (for example, the transfer of the score from a performance overview), the type of appraisal data processing (for example, the transfer of obtained qualifications or the transfer of data a compensation management program).

The next level of the hierarchy consists of the objective setting or appraisal templates 315, which form the basis of the individual objective-setting agreements. One can create as many of these templates as desired, providing every manager in the enterprise with the templates they need to run their departments according to the Management by Objectives philosophy.

The processing of the appraisals may be done to specify if data is taken from a performance overview, whether one or several appraisers are to participate, if the logging feature is active, and if downstream processes should take place after the appraisal is complete (for example, the adjustment of the employee's qualifications profile or the transfer of relevant data to a compensation management module).

Figure 4:
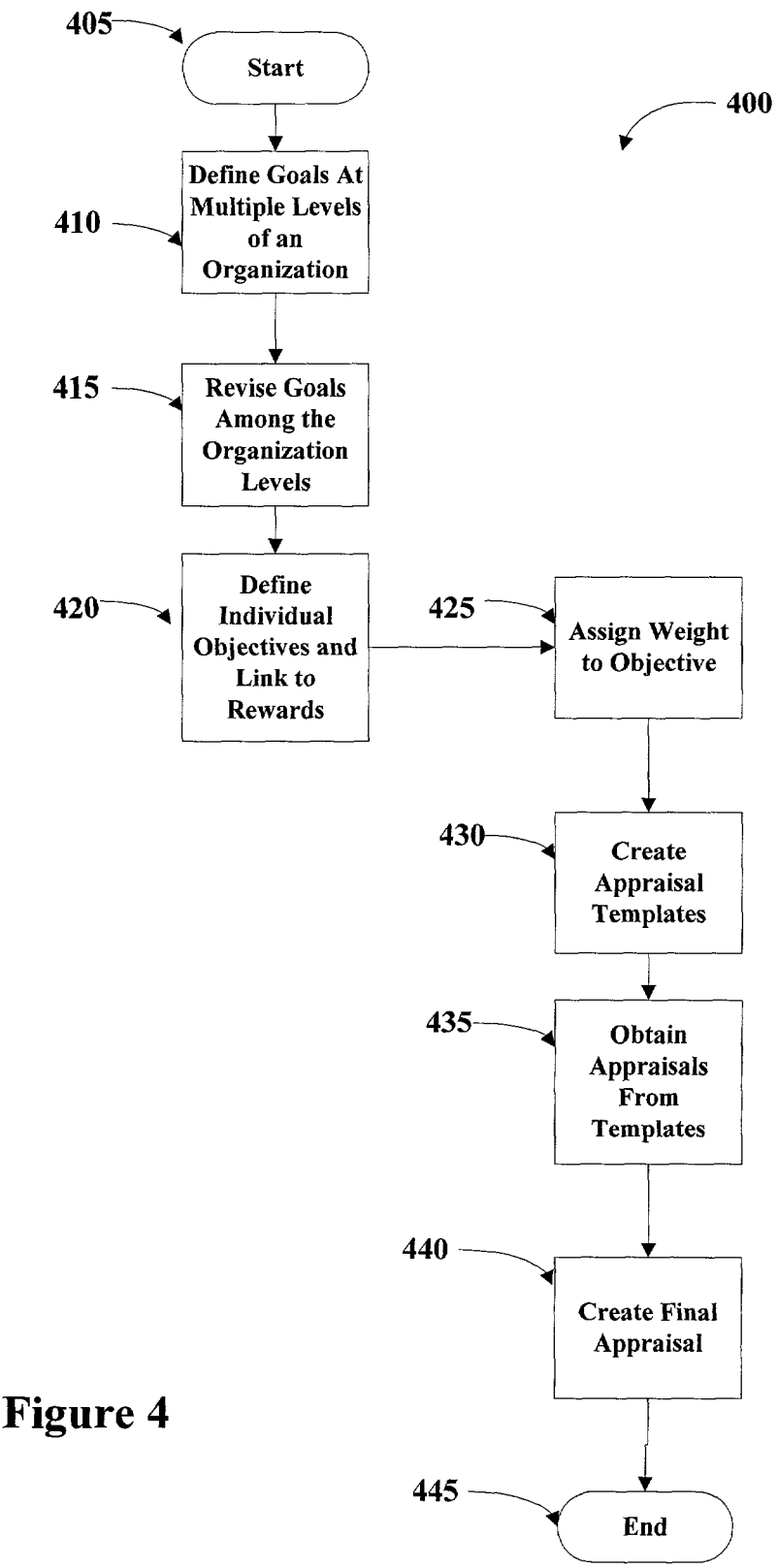
FIG. 4 illustrates a process for implementing the appraisal processing system.

A process 400 for appraisal processing is illustrated in FIG. 4. The process 400 begins at a START block 405. Proceeding to block 410, the process 400 defines the objectives or goals at multiple levels of an organization. As shown in FIG. 1, these goals may begin with the Board, and be defined at multiple levels including upper management, department manager, team leader, and individual employee. Of course, goals may be set at many different levels of an organization. The number of levels to set goals may vary among organizations depending on the organizations size and structure.

Proceeding to block 415, the process 400 then revives the goals among each of the different levels. The goals are adjusted based on the goals from the other levels. The goals may be communicated among levels and adjusted during planning meetings, where the goals are discussed and adjusted. This allows the setting and communicating of the goals to flow in both directions of the company, as illustrated in FIG. 1.

Proceeding to block 420, the process 400 defines objectives for individual employees or departments based on the goals established above. By creating individual objectives, the employees and departments have concrete, establish items to complete. The objectives may also be linked to rewards or incentives for achieving the objectives. For example, an employee's salary adjustment or bonus may be tied to achievement of an individual goal 120, or a department may be honored for achieving a department or team goal 115. By linking the goals to a set reward or incentives, people and departments may be more motivated to achieve the goals due to a concrete incentive. Also, linking objectives to individual employees or departments allows for a more definite determination of job success.

Proceeding to block 425, the process 400 assigns a weight to each objective for the individual employee. As any individual employee may have multiple objectives, it is important to provide a weight for each objective. For example, some objectives may be more complex and require much more work and effort to complete. These objectives should receive a higher weight, and thus count more toward the final appraisal score.

Proceeding to block 430, the process 400 creates appraisal templates to be used in collecting the appraisal information. The appraisal templates may be created using the appraisal template catalog. The templates may be provided to all the reviewers to make the appraisal process more standardized and efficient. The templates may be designed to use any appraisal type, including objective setting, simple appraisal, and 360 degree feedback.

Proceeding to block 435, the process 400 collects the appraisals from the distributed templates. The reviewers complete the templates to provide the data for the appraisals. Upon completion, the templates are automatically forwarded to a central database for collection and compilation.

Proceeding to block 440, the final appraisal is created based on each of the completed templates. The final appraisal combines all the reviews from each of the separate templates, and applies the weighting criteria to create the final appraisal. After the final appraisal is created, the process 400 terminates at END block 445.

Numerous variations and modifications of the invention will become readily apparent to those skilled in the art. Accordingly, the invention may be embodied in other specific forms without departing from its spirit or essential characteristics.

What is claimed is:

1. A computer-implemented method of appraisal comprising:
   receiving, by computer, a specification of goals for an organization;
   defining, by the computer, individual objectives based on the goals;
   assigning, by the computer, weights to the individual objectives;
   creating, by the computer, appraisal templates based on the individual objectives;
   receiving, by the computer, a plurality of appraisals from the appraisal templates;
   combining, by the computer, the plurality of appraisals based on the weights; and
   creating, by the computer, a final appraisal, based on the combined appraisals.

2. The method of claim 1, further comprising obtaining appraisals using an objective setting appraisal type.

3. The method of claim 2, further comprising obtaining appraisals using a simple appraisal type.

4. The method of claim 1, further comprising obtaining appraisals using a 360 degree feedback appraisal type.

5. The method of claim 1, wherein the final appraisal includes a link to a scorecard comprising the goals.

6. The method of claim 1, wherein the individual objectives comprise obtaining a skill included in a requirements profile associated with a position of the individual.

7. The method of claim 1, wherein defining the individual objectives comprises automatically creating an objective based on a qualification profile associated with the individual and a requirements profile associated with a position of the individual.

8. An article comprising a non-transitory storage medium having stored thereon instructions that, when executed by a machine, perform a method, the method comprising;
   defining individual objectives based on organizational goals;
   assigning weights to the individual objectives;
   creating appraisal templates based on the individual objectives;
   obtaining a plurality of appraisals from the appraisal templates; and
   combining the plurality of appraisals based on the weights to create a final appraisal.

9. The article of claim 8, wherein appraisals are obtained using an objective setting appraisal type.

10. The article of claim 9, wherein appraisals are obtained using a simple appraisal type.

11. The article of claim 8, wherein appraisals are obtained using a 360 degree feedback appraisal type.

12. The article of claim 8, wherein the final appraisal includes a link to a scorecard comprising the goals.

13. The article of claim 8, wherein the individual objectives comprise obtaining a skill included in a requirements profile associated with a position of the individual.

14. The article of claim 8, wherein defining the individual objectives comprises automatically creating an objective based on a qualification profile associated with the individual and a requirements profile associated with a position of the individual.

* * * * *